Dec. 2, 1958  R. V. HOWELL  2,862,406
HYDRAULIC TRANSMISSION AND CLUTCH ASSEMBLY
Filed June 11, 1954  2 Sheets—Sheet 2
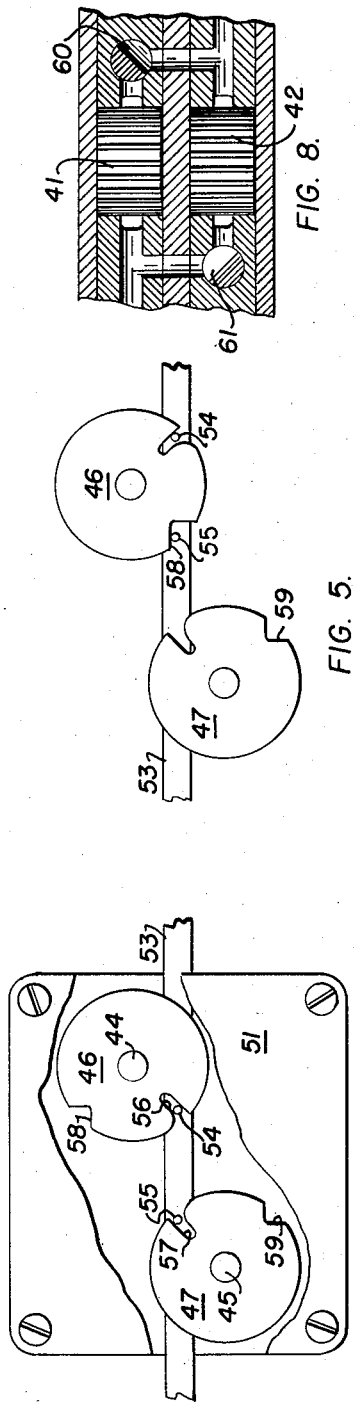
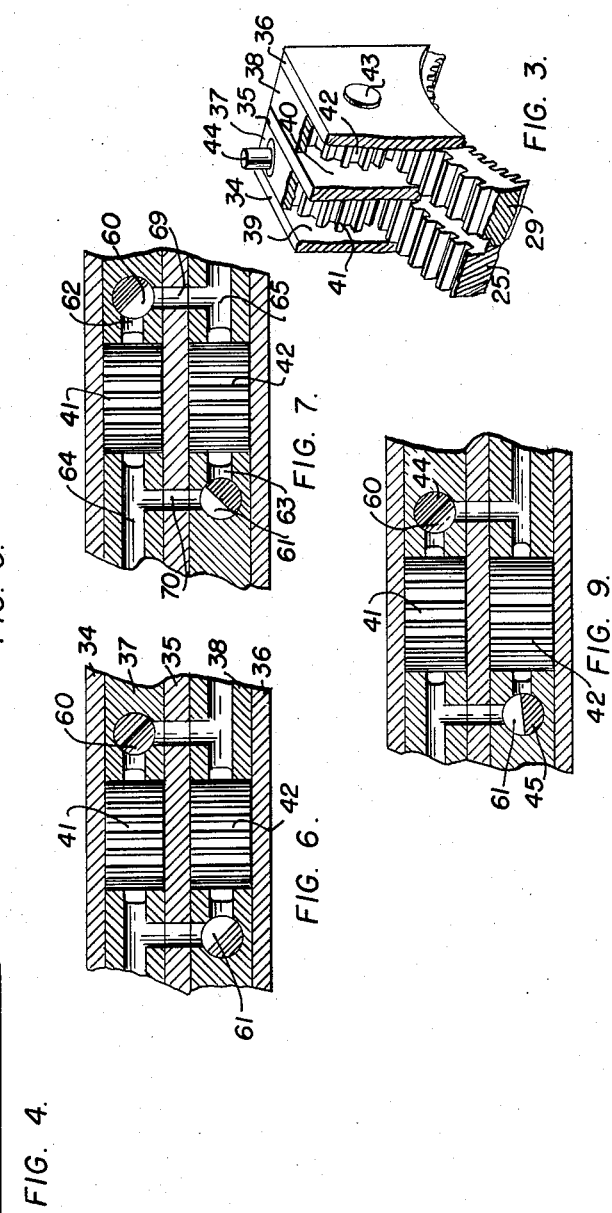
ROBERT V. HOWELL
INVENTOR.
BY *Herbert J. Brown*
ATTORNEY

United States Patent Office 2,862,406  
Patented Dec. 2, 1958

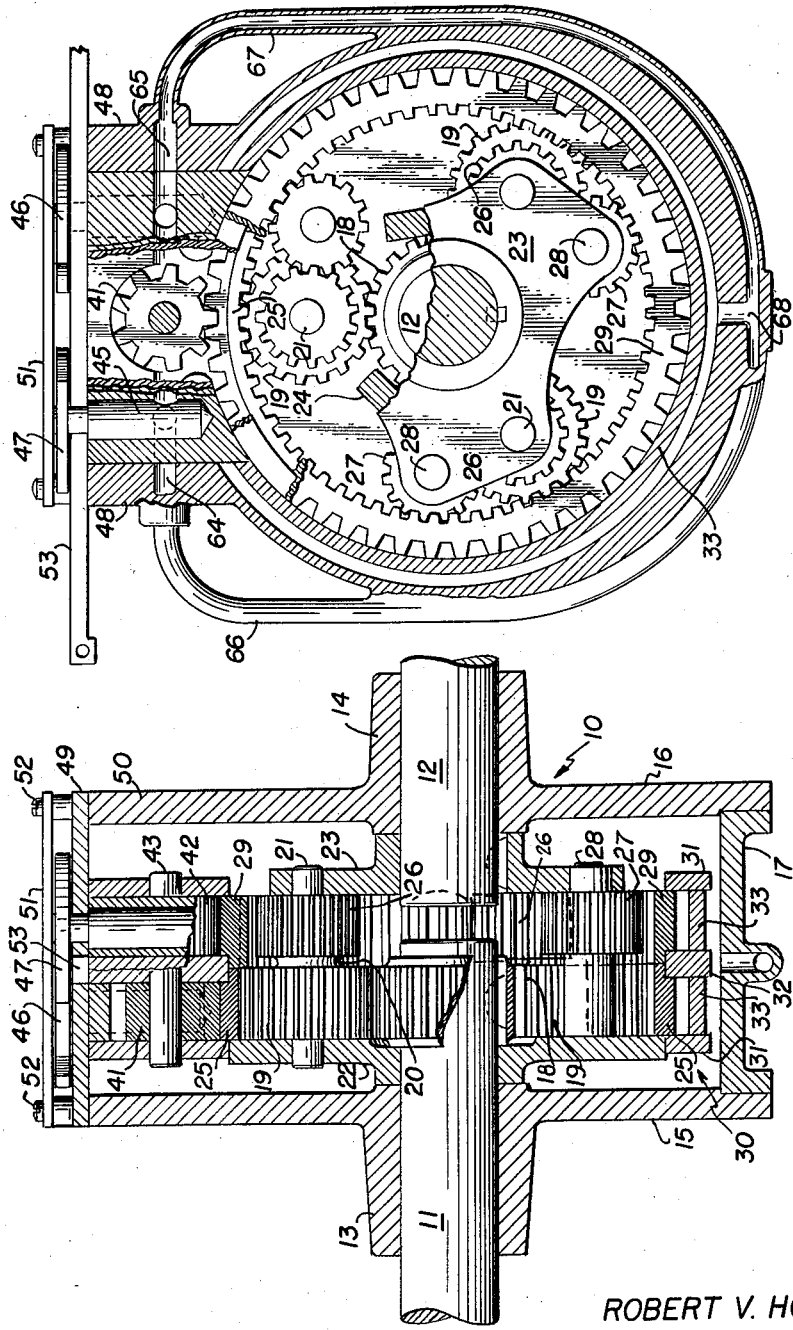

2,862,406

HYDRAULIC TRANSMISSION AND CLUTCH ASSEMBLY

Robert V. Howell, Fort Worth, Tex.

Application June 11, 1954, Serial No. 436,110

6 Claims. (Cl. 74—768)

This invention relates to variable speed transmissions and has reference to hydraulic means for controlling and operating the same.

An object of the invention is to provide a hydraulically operated transmission capable of forward and reverse variable speeds, and one which will serve as a clutch and brake as well.

Another object of the invention is to provide a hydraulically controlled variable speed transmission capable of operating in any desired position, thus lending to the versatility of its use.

Another object of the invention is to provide a hydraulically controlled transmission wherein the hydraulic fluid remains relatively cool.

A further object of the invention is to provide a relatively light weight economical construction capable of transmitting large torque loads with very little power loss.

In the accompanying drawing:

Figure 1 is a broken transverse sectional view of a variable speed transmission embodying the features of the invention.

Figure 2 is a transverse broken sectional view of the transmission shown in Figure 1.

Figure 3 is a broken perspective view of the gear pump and portions of the orbit gears with which the pump gears mesh.

Figure 4 is a broken top plan view of the valve arrangement for controlling the flow of hydraulic fluid in the pump gear. The position of the actuating plates shown is the neutral position of the transmission.

Figure 5 is a top plan view of the actuating plates and control slide in a position for reversing the torque delivered by the present transmission.

Figures 6 through 9 are broken sectional views of the pump and valve arrangements and respectively show the neutral, forward, reverse and half speed forward positions of the valve control arrangement.

In the drawings the numeral 10 generally designates a transmission case having aligned driving and driven shafts 11 and 12 mounted in bearings 13 and 14. The case 10 is generally cylindrical and is comprised of spaced end plates 15 and 16 and a substantially circular casing wall 17 secured therebetween. A sun gear 18 is keyed to the driven shaft 11 within the case 10 and meshes with the large gears 19 of planetary clustered gears 20 mounted for free rotation on shafts 21 supported by spaced carriage plates 22 and 23. The carriage plate 22 adjacent the sun gear 18 is journaled on the driving shaft 11, whereas the other carriage plate 23 is keyed to the driven shaft 12. As shown in Figure 1, the carriage plates 22 and 23 are secured to each other by means of spacers 24.

An orbit gear 25 having internal and external teeth, and herein referred to as the forward orbit gear, meshes with the large gears 19 of the planetary gears 20, whereas the smaller gear 26 of each planetary gear meshes with an idler gear 27 mounted on a shaft 28 supported by the carriage plates 22 and 23. The idler gears 27, in turn, mesh with the inner teeth of an orbit gear 29, herein referred to as the reverse orbit gear. Both orbit gears 25 and 29 are of the same size and are in axial alignment with each other.

A housing 30 encloses the outer teeth of the two orbit gears 25 and 29, and which housing is comprised of outer seal rings 31, and inner seal ring 32, and arcuate partitions 33 therebetween. The adjoining edges of the orbit gears 25 and 29 are in turning contact with each other and are shouldered where they are in turning contact with the inner periphery of the inner seal ring 32.

The upper ends of the arcuate seal rings 31 and 32 are vertically extended, as at 34, 35 and 36, and such extensions may be integral or may be otherwise secured, such as by welding. The inner edges of the vertically extending plates 34, 35 and 36 are in the form of arcs for completing the circles defined by the said seal rings, and the orbit gears 25 and 29 closely fit the inner surfaces of the arcuate partitions 33 of the gear housing 30. Valve blocks 37 and 38 are secured between the vertical extensions 34, 35 and 36, as shown in Figure 3, and the inner edges of which blocks also closely conform with the outer diameters of the orbit gears 25 and 29. Each valve block 37 and 38 is chambered, as at 39 and 40, for closely receiving forward and reverse pump gears 41 and 42 which are supported on a shaft 43 positioned through the plate extensions 34, 35 and 36. The pump gears 41 and 42 mesh with the outer teeth of the orbit gears 25 and 29, and chambers 39 and 40 are open at their inner sides for that purpose.

Each pump gear 41 and 42 is controlled by a rotary valve element 44 and 45 vertically positioned in the respective valve blocks 37 and 38, and which elements are located on opposite sides of said pump gears. The extending outer ends of the valve elements 44 and 45 are provided with round, flat actuating plates 46 and 47. The casing walls 17 extend vertically at each side thereof, as at 48, and engages the sides of the seal ring extensions 34, 35 and 36, and the valve blocks 37 and 38. A case plate 49 fits over the upper end of the case wall extension 48 and corresponding extensions 50 of the case plates 16. A cover 51 is held in place above the actuating plates 46 and 47 by means of screws 52, as shown in Figure 2. A control bar 53 is slidably mounted in the case cover 49 and has projecting pins 54 and 55 thereon for coaction with cam slots 56 and 57 in the actuating plates 46 and 47. Additional slots 58 and 59 are formed in the control plates 46 and 47 for accommodating the pins 54 and 55 when the control bar is in either its full forward or full reverse positions.

The valve elements 44 and 45 are provided with transverse slots 60 and 61 which communicate with ports 62 and 63 extending to the gear chambers 39 and 40. On the opposite side of each gear 41 and 42 with respect to its associated valve element 44 and 45, there is a duct 64 and 65 communicating with the interior of the case 10 by means of conduits 66 and 67. A central port 68 connects the conduits 66 and 67 with the lower center portion of the case 10, but it is to be understood that the connecting port 68 may be otherwise located and that if the case is filled with a control fluid, such as oil, the described transmission may be operated in any desired position. Bypass ports 69 and 70 respectively connect the valve elements 44 and 45 with the ducts 64 and 65 on opposite sides of the center extension 35.

In operation, assuming the driving shaft 11 turns clockwise as viewed from the end on which the sun gear 18 is mounted, and with the valve elements 44 and 45 in their open positions, as shown in Figure 6, the planetary gears 20 turn in a counter clockwise direction and thus cause the forward orbit gear 25 to turn in the same direction. Through the small gear 26 of the orbit gear 20 and the idler gears 27, the reverse orbit gear 29 is caused to turn in an opposite direction at the same rate as the forward orbit gear 25; thus the driven shaft 12 does not turn. During the last referred to operation, the pump gears 41 and 42 are allowed to turn freely and a large portion of the hydraulic fluid circulates between these gears through the bypasses 69 and 70. During this neutral operation, the control bar 53 is intermediately positioned, as shown in Figure 4.

In order to turn the driven shaft 12 in the same direction as the driving shaft 11, the control bar 53 is moved to the left with reference to Figure 4, thus causing the valve elements 44 and 45 to assume the positions shown in Figure 8. The valve element 44 on the forward operating side of the transmission is closed, thus stopping the action of the forward pump gear 41, yet allowing passage of fluid through the remaining pump gear 42. In this position the forward orbit gear 25 is held stationary and the rotation of the driving shaft 11 imparts a clockwise planetary movement of the planetary gears 20 and at the same time imparts counterclockwise rotation to the small gear 26 of the planetary gear which, in turn, causes the idler gear 27 to rotate in a clockwise direction. Since the latter is connected with the internal teeth of the remaining orbit gear 29, a clockwise motion is imparted to the latter, and by reason of the planetary action referred to, together with the imparted rotation of the orbit gear, the full increased ratio of the transmission is imparted to the driven shaft 12. When the position of the control bar 53 is reversed, as shown in Figure 5, the valves 44 and 45 assume an opposite position, as shown in Figure 7, and the reverse pump gear 42 is stopped, and the last described transmission action is reversed. Any desired variable speed, either forward or reverse, may be obtained by partially actuating the control bar 53 in either direction. In the latter case, one pump gear, either 41 or 42 is restricted more than the other, as shown in Figure 9, and the hydraulic fluid passes more freely through one such gear than the other.

By stopping the flow of fluid the transfer of power is diverted to a mechanical means, thereby reducing the power loss inherent in conventional means for transmitting power through a hydraulic fluid under pressure.

The foregoing description and drawings are exemplary, and it is to be understood that the invention may be varied in many ways by those versed in the art, and which variations may come within the scope of the appended claims.

What is claimed is:

1. In a variable speed transmission, a pair of shafts in axial alignment with each other, a pair of orbit gears in side by side relation each having internal and external teeth, each orbit gear being positioned around the axis of each said shaft, a sun gear mounted on one said shaft, an axially extended planetary gear meshing with the teeth of said sun gear and with the internal teeth of one said orbit gear, an idler gear meshing with the internal teeth of the remaining orbit gear outwardly of the axis of the remaining said shaft and with the teeth of the said extended planetary gear, means rotatably mounting said planetary gear, said means being rigid with the last said shaft, a separate pump gear meshing with the external teeth of each said orbit gear, a separate fluid supply duct communicating with each said pump gear, and means selectively controlling said fluid supply.

2. In a variable speed transmission as defined in claim 1, bypass ports connecting said ducts with opposite sides of said pump gears and providing recirculating means therebetween.

3. In a variable speed transmission as defined in claim 1, a sealed case around said transmission, and means communicating said ducts with said case.

4. In a variable speed transmission as defined in claim 1, the construction wherein separate seals enclose the external teeth of each said orbit gear.

5. In a variable speed transmission as defined in claim 1, the construction wherein said means selectively controlling said fluid supply is in the form of a valve in each said supply duct, and including means operating said valves in unison.

6. An apparatus of the type described comprising a hollow fluid-tight casing defining a reservoir for receiving hydraulic fluid, a pair of coaxial shafts journaled in said casing, a sun gear fixed to one of said shafts within said casing, carriage means fixed to the other of said shafts within said casing, planetary gears journaled on said carriage means and meshing with said sun gear, a first orbit gear having internal teeth meshing with said planetary gears, a coaxial gear fixed to rotate with each planetary gear, idler gears journaled on said carriage means and meshing with said coaxial gears, a second orbit gear having internal teeth meshing with said idler gears, said first and second orbit gears having external teeth, pump gears meshing with the external teeth of said orbit gears, means within said casing enclosing the external teeth and associated pump gear of each orbit gear separate from the other for receiving hydraulic fluid so as to form separate hydraulic gear pumps, duct means communicating both sides of each gear pump with the reservoir defined by said casing, valve means in said duct means controlling the flow of hydraulic fluid through each gear pump, and means carried by said casing for actuating said valve means.

References Cited in the file of this patent

UNITED STATES PATENTS

| | | |
|---|---|---|
| 1,161,066 | Minor | Nov. 23, 1915 |
| 2,390,626 | Szekely | Dec. 11, 1945 |
| 2,529,811 | Nordin | Nov. 14, 1950 |
| 2,618,175 | Bruer | Nov. 18, 1952 |
| 2,748,623 | Hill | June 5, 1956 |

FOREIGN PATENTS

| | | |
|---|---|---|
| 603,395 | France | Jan. 8, 1926 |
| 1,019,859 | France | Nov. 5, 1952 |